US011196257B2

United States Patent
Oh et al.

(10) Patent No.: US 11,196,257 B2
(45) Date of Patent: Dec. 7, 2021

(54) SYSTEM FOR MANAGING DISTRIBUTION NETWORK

(71) Applicant: Korea Institute of Energy Research, Daejeon (KR)

(72) Inventors: Sea-Seung Oh, Daejeon (KR); Hak-Geun Jeong, Daejeon (KR); Jongbok Baek, Daejeon (KR); Soo-Bin Han, Daejeon (KR); Sukin Park, Daejeon (KR); Su-Yong Chae, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 0 days.

(21) Appl. No.: 16/923,709

(22) Filed: Jul. 8, 2020

(65) Prior Publication Data
US 2021/0104891 A1     Apr. 8, 2021

(30) Foreign Application Priority Data

Oct. 2, 2019 (KR) .................. 10-2019-0122124

(51) Int. Cl.
*H02J 3/00* (2006.01)
*G06Q 50/06* (2012.01)

(52) U.S. Cl.
CPC .............. *H02J 3/007* (2020.01); *G06Q 50/06* (2013.01); *H02J 3/004* (2020.01); *H02J 3/0012* (2020.01)

(58) Field of Classification Search
None
See application file for complete search history.

(56) References Cited

U.S. PATENT DOCUMENTS

| 2014/0049109 A1* | 2/2014 | Kearns .............. H02J 13/00034 307/52 |
| 2016/0349296 A1* | 12/2016 | Tsunedomi ........ G01R 21/1331 |
| 2017/0214273 A1 | 7/2017 | Kogo et al. |
| 2018/0217568 A1* | 8/2018 | Parvania .............. G05B 13/048 |
| 2019/0089155 A1* | 3/2019 | Cui ........................ G06Q 10/00 |

FOREIGN PATENT DOCUMENTS

| JP | 2016-184906 A | 10/2016 |
| JP | 2016184906 A | * 10/2016 |
| JP | 6604327 B2 | 11/2019 |
| KR | 10-0683246 B1 | 2/2007 |
| KR | 10-2013-0099103 A | 9/2013 |
| KR | 10-1390104 B1 | 4/2014 |
| KR | 10-2014-0065199 A | 5/2014 |
| KR | 10-2016-0047848 A | 5/2016 |
| KR | 10-2019-0063703 A | 6/2019 |
| KR | 10-2088365 B1 | 3/2020 |

* cited by examiner

*Primary Examiner* — Jared Fureman
*Assistant Examiner* — Joel Barnett
(74) *Attorney, Agent, or Firm* — Birch, Stewart, Kolasch & Birch, LLP

(57) ABSTRACT

An embodiment provides system for managing a distribution network, the system including: a plurality of energy routers configured to control the amount of router power flowing between the distribution network and internal resources; and a distribution network management apparatus configured to transmit a command value for the amount of router power, which is produced according to variability of the distribution network, to the energy router while adjusting a communication cycle of the command value depending on a control success rate of the energy router for the command value.

12 Claims, 10 Drawing Sheets

SYSTEM FOR MANAGING DISTRIBUTION NETWORK

CROSS REFERENCE TO RELATED APPLICATION

This application claims priority from Korean Patent Application No. 10-2019-0122124, filed on Oct. 2, 2019, which is hereby incorporated by reference for all purposes as if fully set forth herein.

BACKGROUND OF THE INVENTION

1. Field of the Invention

The present embodiment relates to a system for managing a distribution network.

2. Description of the Prior Art

In the case where demand for electric power increases significantly, existing centralized power generation systems such as hydroelectric, thermal, and nuclear power generation make it difficult to quickly and efficiently cope with the electric power demand.

Therefore, in recent years, distributed generations based on new renewable energy generation systems such as photovoltaic power generation systems, wind power generation systems, or the like or based on small-scale power generation systems such as diesel power generation systems, gas power generation systems, or the like have been proliferated and widely used.

A large number of the distributed generations are linked to distribution lines, that is, distribution systems for distributing power output from distribution substations to customers such as office facilities, public facilities, private houses, and apartment houses. For example, a photovoltaic generation system converts DC power generated by a photovoltaic generation panel into AC power suitable for a distribution system using a power conditioning system (PCS), thereby supplying the same to the distribution line.

Here, among the distributed generations in the distribution system, new renewable energy generation systems have a large variation in power generated depending on weather conditions, seasons, and the like.

For this reason, in the case where a plurality of new renewable energy generation systems is provided in the distribution system, it is difficult to stably operate the distribution system. In other words, the irregular power generated in the new renewable energy generation system linked to the distribution system may cause the voltage of the distribution line, that is, the voltage of the power distributed to the consumers through the distribution line, to fall outside of a rated voltage range, or may cause the frequency of the power to fall outside of a rated frequency range.

If the unstable power is supplied to electric equipment of the customers as described above, the electric equipment may malfunction or stop the operation thereof.

As utilization of new renewable energy generation systems is increasing in line with highlighting the importance of environmental preservation in recent years, a method of managing a distribution network capable of coping with the above problems is required.

SUMMARY OF THE INVENTION

In this background, an objective of the present embodiment is, in one aspect, to provide a distribution network management system that transmits command values for bidirectional power conversion of energy routers performing bidirectional power conversion between the distribution network and internal resources in order to absorb the variability of the distribution network while adjusting communication cycles of the command values depending on the states of the energy routers, thereby efficiently managing the distribution network.

In order to attain the objective described above, an embodiment provides a distribution network management system including: a plurality of energy routers configured to control the amount of router power flowing between the distribution network and internal resources; and a distribution network management apparatus configured to transmit a command value for the amount of router power, which is produced according to the variability of the distribution network, to the energy router while adjusting a communication cycle of the command value depending on the state of the energy router regarding the command value.

The state of the energy router may include a control success rate of the energy router, and the distribution network management apparatus may be configured to control the communication cycle to be shortened as the control success rate increases.

The distribution network management apparatus may be configured to, if the control success rate is greater than or equal to a predetermined value, control the communication cycle to be prolonged as the control success rate increases.

The distribution network management apparatus may be configured to control the plurality of energy routers in different communication cycles depending on the control success rate.

The distribution network management apparatus may be configured to produce the command value for each energy router through a processing optimization operation for the plurality of energy routers.

The state of the energy router may include the control success rate of the energy router, and the distribution network management apparatus may be configured to perform the processing optimization operation prior to a subsequent communication time and, if the control success rate is less than a predetermined value, exclude the energy router from the processing optimization operation.

The state of the energy router may include the control success rate of the energy router, and the distribution network management apparatus may be configured to perform the processing optimization operation prior to a subsequent communication time and, if the control success rate is greater than or equal to a predetermined value, process the energy router using a fixed command value in the processing optimization operation.

The state of the energy router may include the control success rate of the energy router, and the energy router may be configured to compare the command value with the amount of router power, thereby producing the control success rate, and transmit the control success rate to the distribution network management apparatus.

The state of the energy router may include the control success rate of the energy router, and if the control success rate is equal to or less than a predetermined value for a predetermined period of time, the energy router may enter a maintenance mode.

The state of the energy router may include the control success rate of the energy router, and if the control success rates for a predetermined number of command values are equal to or less than a predetermined value, the energy router may enter a maintenance mode.

The state of the energy router may include an amount of available resources, which can be controlled by the energy router, and the energy router may be configured to monitor the internal resources, thereby producing the amount of available resources, and transmit the amount of available resources to the distribution network management apparatus.

The amount of available resources may be determined according to the state of charge (SOC) of an energy storage system among the internal resources.

The state of the energy router may include a magnitude of the variability that is caused by the amount of router power in a line section adjacent to the energy router, and the distribution network management apparatus may be configured to adjust the communication cycle of the command value to be long if the magnitude of the variability is equal to or less than a predetermined value or if a predicted magnitude of the variability is equal to or less than a predetermined value As described above, according to the present embodiment, since a distribution network management apparatus is able to reduce the amount of computation of the distribution network management apparatus by adjusting the communication cycle of a command value for each energy router depending on the states of the energy routers when transmitting the command value for bidirectional power conversion of the energy routers, the distribution network management apparatus is able to properly manage the amount of computation even if variabilities occur frequently or simultaneously in the distribution network, thereby efficiently managing the distribution network.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE EXEMPLARY EMBODIMENTS

Figure 1:
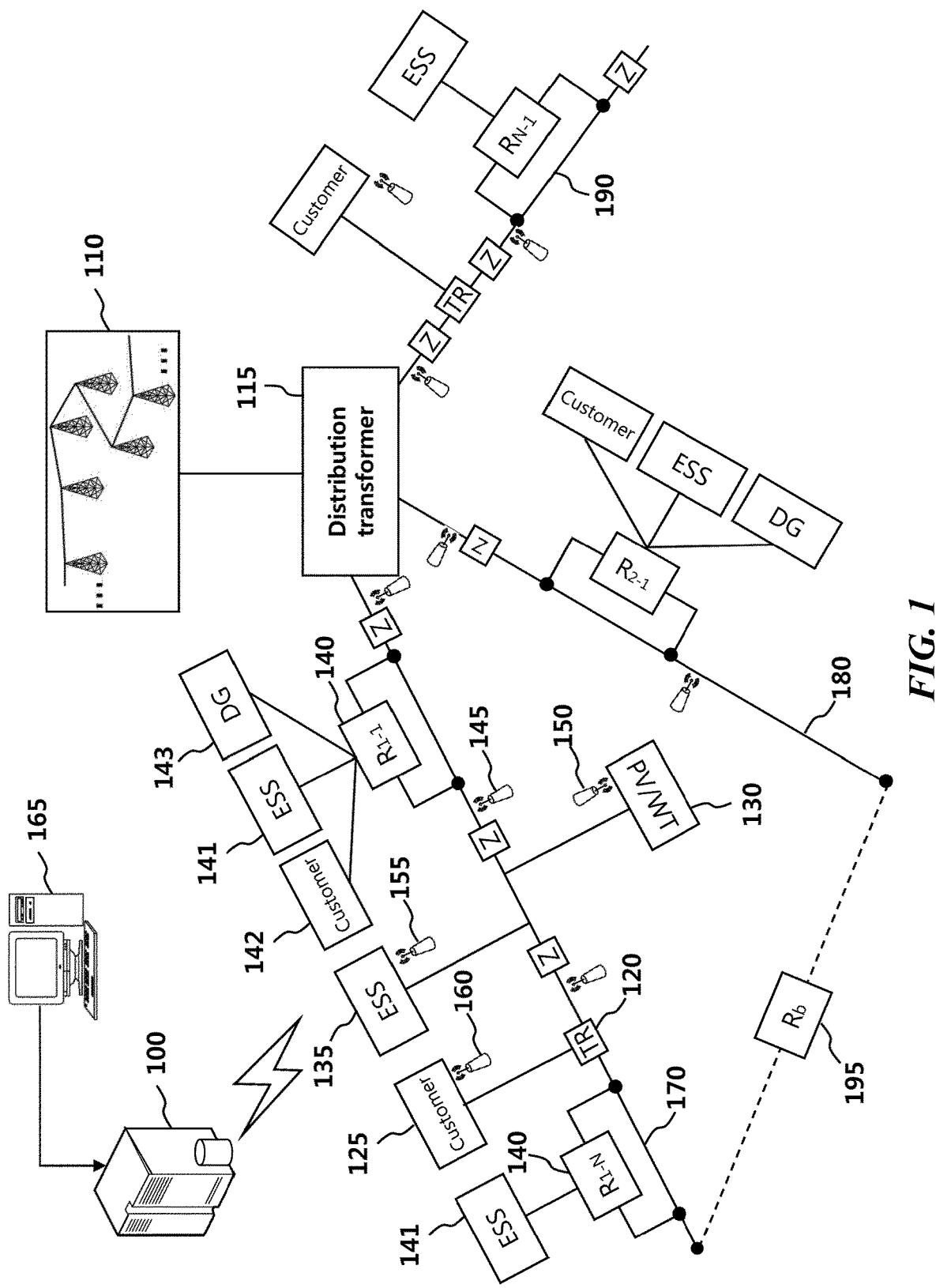
FIG. 1 is a diagram illustrating an example of a distribution network to which a distribution network management system is applied according to an embodiment.

Hereinafter, some embodiments of the present disclosure will be described in detail with reference to the exemplary drawings. With regard to reference numerals given to respective elements in the drawings, it must be noted that the same element may have the same reference numeral even though the element is illustrated in different drawings. In addition, in describing the present disclosure, if it is determined that a detailed description of related well-known configurations or functions may obscure the subject matter of the present disclosure, the detailed description will be omitted.

In addition, terms "first", "second", "A", "B", "(a)", "(b)", or the like may be used to describe elements of the present disclosure. These terms are merely intended to distinguish the elements from other elements, and are not intended to limit the corresponding element to a specific nature, order, or sequence. In the case where an element is described as being "coupled", "combined", or "connected" to another element, it should be understood that another element may be "coupled", "combined", or "connected" between the two elements, as well as that the element may be directly coupled or connected to another embodiment.

FIG. 1 is a diagram illustrating an example of a distribution network to which a distribution network management system is applied according to an embodiment.

Referring to FIG. 1, in general, a distribution network may include a first distribution line 170 to $N^{th}$ distribution line 190 branching off from a distribution transformer 115, and one or more pole transformers 120 and customers 125 may be connected to each distribution line. Here, a sensor 160 capable of measuring power consumption of the customer 125 may be provided in the customer 125.

In addition, one or more new renewable energy generation systems 130 (PV/WT) such as photovoltaic power generation systems and wind power generation systems may be connected to each distribution line. In addition, one or more energy storage systems (ESSs) 135 for storing dump power in a specific region and supplying the stored power to customers in the case where power supplied to the customers is insufficient through a distribution line in the specific region may be connected to the distribution line. Here, the distribution transformer 115 may be provided in the substation, and may convert a transmission voltage (e.g., 154 kV, 345 kV, or 765 kV) of power transmitted in the power transmission system 110 to a distribution voltage (e.g., 22.9 kV).

Although not illustrated in FIG. 1, one or more diesel power generation systems may be connected to each distribution line, and one or more gas power generation systems may also be connected thereto.

The one or more new renewable energy power generation systems 130 connected to the distribution line as described above are unpredictable power generation systems in which generation power irregularly varies depending on the weather, and the irregular amount of power generation of the new renewable energy generation system 130 may act as a disturbance on the distribution line. In other words, the irregular amount of power generation of the new renewable energy generation system 130 may put the distribution line in an unstable state so that the voltage of the power distributed to the customer through the distribution line may fall outside of a rated voltage range (e.g., 380 V±α or 220 V±α), or the frequency of the power may fall outside of a rated frequency range (e.g., 60 Hz±β).

An embodiment provides a distribution network management system for stably managing the states of the distribution lines to which one or more new renewable energy generation systems 130 are connected.

Hereinafter, a distribution network management system according to an embodiment will be described.

Figure 2:
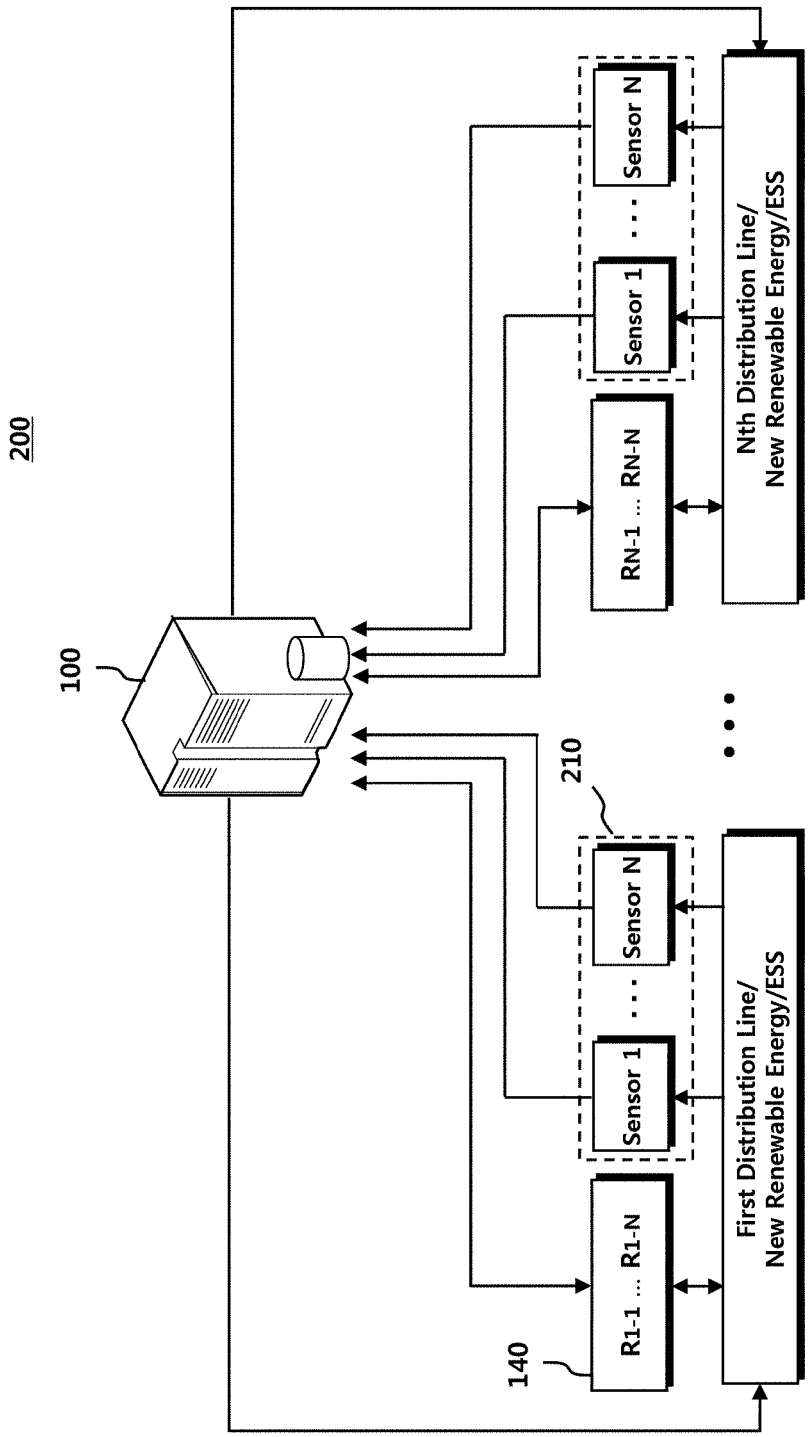
FIG. 2 is a diagram illustrating the configuration of a distribution network management system according to an embodiment.

FIG. 2 is a diagram illustrating the configuration of a distribution network management system according to an embodiment.

Referring to FIG. 2, a distribution network management system 200 may include a plurality of sensors 210, a plurality of energy routers 140 $R_{1-1}$ to $R_{1-N}$, and a distribution network management apparatus 100. Here, the plurality of sensors 210 and the plurality of energy routers 140 $R_{1-1}$ to $R_{1-N}$ may be elements installed in or connected to the first distribution line 170 to which one or more new renewable energy generation systems 130 are connected, among a plurality of distribution lines constituting the distribution network. In addition, the same elements as those in the first distribution line 170 may be applied to the distribution line to which one or more new renewable energy generation systems are connected, among the second distribution line 180 to the $N^{th}$ distribution line 190.

In other words, a plurality of sensors and a plurality of energy routers may be installed in or connected to the respective distribution lines to which one or more new renewable energy generation systems are connected.

In an embodiment, for the convenience of explanation, a description will be made based only on the operation of a plurality of sensors 210 and a plurality of energy routers 140 $R_{1-1}$ to $R_{1-N}$, which are installed in or connected to the first distribution line 170.

The plurality of sensors 210 are arranged in a distribution network to which a plurality of unpredictable power generation systems is connected.

In other words, the plurality of sensors 210 may be installed in each section of the first distribution line 170 included in the distribution network, one or more new renewable energy generation systems 130 connected to the first distribution line 170, and one or more energy storage systems 135 connected to the first distribution line 170. The plurality of unpredictable power generation systems may refer to one or more new renewable energy generation systems 130.

The plurality of sensors 210 may generate monitoring data on the power generation state of each of the one or more new renewable energy generation systems 130, the line state of each section of the first distribution line 170, the charging and discharging state of each of the one or more energy storage systems 135, and the like, and may transmit the monitoring data to the distribution network management apparatus 100, which will be described later.

Specifically, at least one sensor 145 that may be installed in each section of the first distribution line 170, among the plurality of sensors 210, may measure at least one of a voltage, a current, and a frequency of the power being distributed to the first distribution line 170 for each section thereof, or may measure an impedance Z of the first distribution line 170 for each section thereof. In other words, the monitoring data on the first distribution line 170 may include at least one piece of section-specific voltage information on the power being distributed to the first distribution line 170, section-specific current information thereon, section-specific frequency information thereon, and section-specific impedance Z information on the first distribution line 170, and may further include position information on each section, that is, information on the positions at which one or more sensors 145 are arranged, or identification information on one or more sensors 145.

Among the plurality of sensors 210, one or more sensors 150 installed in one or more new renewable energy generation systems 130 may measure at least one of a voltage, a current, and a frequency of generation power, which is generated by one or more new renewable energy generation systems 130 and is supplied to the first distribution line 170. In other words, the monitoring data on one or more new renewable energy generation systems 130 may include at least one piece of voltage information, current information, and frequency information on the generation power in each of the new renewable energy generation systems, and may further include position information or identification information on one or more new renewable energy generation systems 130, or may further include identification information on one or more sensors 150.

Among the plurality of sensors 210, one or more sensors 155 installed in one or more energy storage systems 135 may measure at least one of a voltage, a current, and a frequency of charging power, which is input from the first distribution line 170 to the energy storage system 135, or may measure at least one of a voltage, a current, and a frequency of discharging power, which is output from the energy storage system 135 to the first distribution line 170. Here, the monitoring data on one or more energy storage systems 135 may include at least one piece of voltage information, current information, and frequency information on the charging power, or may include at least one piece of voltage information, current information, and frequency information on the discharging power. In addition, the monitoring data may further include position information or identification information on one or more energy storage systems 135, or may further include identification information on one or more sensors 155.

The plurality of sensors 210 described above may be one or more of voltage sensors, current sensors, and micro phase measurement units (PMUs). In addition, the plurality of sensors 210 may include at least one of a wired communication module and a wireless communication module for communicating with the distribution network management apparatus 100. Here, the wired communication module may be a network interface card (NIC) module or the like, and the wireless communication module may be a Wi-Fi communication module, a Long-Term Evolution (LTE) communication module, a 5G communication module, or the like.

A plurality of energy routers 140 $R_{1-1}$ to $R_{1-N}$ may absorb the variability of the distribution network, which is caused by the new renewable energy generation systems 130, using the energy storage system 141. Here, the plurality of energy routers 140 $R_{1-1}$ to $R_{1-N}$ may absorb the variability of the distribution network using the energy storage system 141 through bidirectional power conversion.

In other words, one or more of the plurality of energy routers 140 may receive a command value for resolving the variability of the first distribution line 170 from the distribution network management apparatus 100. Here, the variability of the first distribution line 170 may be the variability in at least one of a voltage, a current, and a frequency of the power being distributed to the first distribution line 170.

One or more of the plurality of energy routers 140 may receive AC power from the first distribution line 170 according to command values, may convert the AC power into DC power, and may store the DC power in the energy storage system 141 ESS.

At least one of the plurality of energy routers 140 may convert the DC power stored in the energy storage system 141 into AC power according to a command value, and may transmit the same to the first distribution line 170, or may convert DC power generated in a distributed generation 143 DG to AC power, and may transmit the same to the first distribution line 170. Here, the distributed generation 143 may include a new renewable energy generation system, such as a photovoltaic generation system, a wind power generation system, or the like, a diesel power generation system, a gas power generation system, or the like.

Each of the plurality of energy routers 140 may have an AC/DC converter, a DC/DC converter, a DC/AC converter, and the like provided therein, and, as shown in FIG. 1, one terminal thereof may be connected to the first distribution line 170 and the opposite terminal thereof may be connected to the energy storage system 141.

The energy storage system 141 connected to the opposite terminal of the energy router may be controlled by a corresponding energy router, instead of the distribution network management apparatus 100, which will be described below.

At least one of the customer 142 and the distributed generation 143 may be further connected to the opposite terminal of the energy router. The customer 142 or the distributed generation 143 connected to the opposite terminal of the energy router may be controlled by a corresponding energy router.

In an embodiment, the command value may include information on the amount of reception power or information on the amount of transmission power of the energy router in order for the energy router to absorb the variability in a section of the first distribution line 170. Here, the variability in a section of the first distribution line 170 may indicate that at least one of a voltage, a current, and a frequency of power changes in a section of the first distribution line 170 due to irregular power generation in one or more new renewable energy generation systems 130.

At least one of the plurality of energy router 140, which has received the command value, may receive power corresponding to the amount of reception power contained in the information on the amount of reception power from a section of the first distribution line 170, thereby storing the same in each energy storage systems 141 connected thereto, or may output power corresponding to the amount of transmission power contained in the information on the amount of transmission power from each energy storage systems 141 connected thereto, thereby transmitting the same to a section of the first distribution line 170.

In addition, the energy router to which the distributed generation 143 is connected, among one or more energy routers, may convert DC power received from the distributed generation 143 to AC power corresponding to the amount of transmission power, and may transmit the same to a section of the first distribution line 170.

In an embodiment, at least one energy router receiving the command value may be an energy router arranged adjacent to the section, or may be an energy router having an amount of available resources greater than or equal to a predetermined value. Here, the available resource may be the available charging capacity or the available discharging capacity of the energy storage system 141 connected to each of the one or more energy routers, or may be the amount of real-time power generation or an available amount of power generation of the distributed generation 143 connected to each of the one or more energy routers.

In addition, the available resource greater than or equal to a predetermined value may indicate that the available charging capacity or available discharging capacity of the energy storage system 141 connected to each of the one or more energy routers is greater than or equal to a predetermined value or that the amount of real-time power generation or available amount of power generation of the distributed generation 143 is greater than or equal to a predetermined value.

In an embodiment, one or more energy routers receiving the command values may be energy routers having the operating cost equal to or less than a predetermined value. Here, the operating cost may be the cost required for charging or discharging the energy storage system 141 connected to each of the one or more energy routers, or may be the cost required for power generation of the distributed generation 143 connected to each of the one or more energy routers.

In an embodiment, one or more energy routers receiving the command values may be energy routers in which the number of charging and discharging operations of the energy storage system 141 connected to each of the one or more energy routers is equal to or less than a predetermined value.

Meanwhile, in addition to reception of the command value from the distribution network management apparatus 100, the plurality of energy routers 140 may measure the amounts of transmission and reception power of the energy routers, that is, the amount of router power flowing between the distribution network and the energy storage system 141 or the distributed generation 143, which is an internal resource of the energy router, or the like, and may transmit the same to the distribution network management apparatus 100. In addition, the plurality of energy routers 140 may directly measure state-of-charge (SOC) information on the energy storage systems 141 connected to each of the plurality of energy routers, or may receive SOC information from the energy storage system 141, thereby transmitting the SOC information to the distribution network management apparatus 100.

In addition, the plurality of energy routers 140 may measure the number of charging and discharging operations of the energy storage system 141 connected to each of the plurality of energy routers, and may transmit information on the number of charging and discharging operations to the distribution network management apparatus 100.

In addition, the energy router to which the distributed generation 143 is connected, among the plurality of energy routers 140, may directly measure information on the amount of real-time power generation in the distributed generation 143, or may receive the same from the distributed generation 143, thereby transmitting the information on the amount of real-time power generation to the distribution network management apparatus 100.

To this end, the plurality of energy routers 140 may include at least one of a wired communication module and a wireless communication module for communicating with the distribution network management apparatus 100. Here, the wired communication module may be a network interface card (NIC) module or the like, and the wireless communication module may be a Wi-Fi communication module, a Long-Term Evolution (LTE) communication module, a 5G communication module, or the like.

In an embodiment, the amount of router power may include the amount of reception power, which is received from the first distribution line 170 and is transmitted to the energy storage system 141 that is an internal resource by the energy router, or the amount of transmission power, which is received from the energy storage system 141 or the distributed generation 143, which is an internal resource, and is transmitted to the first distribution line 170 by the energy router.

The distribution network management apparatus 100 may be an apparatus that manages the distribution network including the first distribution line 170 to the $N^{th}$ distribution line 190 branching off from the distribution transformer 115. The distribution network management apparatus 100 may manage such that the voltage and the frequency of the power distributed to the distribution line, to which one or more new renewable energy generation systems 130 are connected, do not fall outside of an rated voltage range (e.g., 380 V±α or 220 V±α) and an rated frequency range (e.g., 60 Hz±β), respectively.

The distribution network management apparatus 100 may receive monitoring data from a plurality of sensors 210, and may input processed data of the monitoring data into a virtual physical system for the distribution network, thereby producing command values for one or more of the plurality of energy routers 140.

In addition, the distribution network management apparatus 100 may transmit the produced command values to the one or more energy routers.

Hereinafter, for the convenience of description, only the configuration in which the distribution network management apparatus 100 manages the state of the first distribution line 170 having one or more new renewable energy generation systems 130 connected thereto will be described. However, in the actual application of the embodiment, the configuration in which the distribution network management apparatus 100 manages the state of the first distribution line 170 may be applied to other distribution lines (distribution lines having one or more new renewable energy generation systems connected thereto) in the same manner.

In an embodiment, the distribution network management apparatus 100 may receive monitoring data from a plurality of sensors 210 installed in the first distribution line 170, one or more new renewable energy generation systems 130, the energy storage system 135 directly connected to the first distribution line 170, and the like. Here, the monitoring data may include at least one piece of information on the power generation states of one or more new renewable energy generation systems 130, information on the state of each line section of the first distribution line 170, and information on the charging and discharging states of one or more energy storage systems 135.

The distribution network management apparatus 100 having received the monitoring data may perform data pre-processing and data categorizing on the monitoring data. Here, "data pre-processing" is an operation of transforming data to conform to the purpose of analysis, and may include operations such as data purification, data integration, data reduction, data conversion, data discretization, and the like.

The distribution network management apparatus 100 may generate prediction data on the state of the first distribution line 170 (i.e., the distribution network) after a predetermined period of time using the monitoring data on which data pre-processing and the like have been performed, and may input the prediction data into a virtual physical system, thereby calculating command values. In other words, the processed data of the monitoring data may be prediction data.

Here, since the amount of power generation in one or more new renewable energy generation systems 130 varies depending on the weather, the distribution network management apparatus 100 may further receive weather information on the region in which each of the one or more new renewable energy generation systems 130 is located from an external system (e.g., a weather observation system), and may further utilize the weather information in generation of the prediction data.

In an embodiment, the "virtual physical system" may be digital copies of physical objects such as the first distribution line 170, one or more new renewable energy generation systems 130, the energy storage systems 135, and the plurality of energy routers 140, that is, a system obtained by virtualizing the physical objects, and the distribution network management apparatus 100 may apply the monitoring data, which is data on the physical objects, to the virtual physical system, thereby producing command values for managing the first distribution line 170. Here, the distribution network management apparatus 100 may receive and store virtual physical model data related to the virtual physical system from the manager terminal device 165 illustrated in FIG. 1.

The distribution network management apparatus 100 may receive and store control policies required for producing the command values from the manager terminal device 165 illustrated in FIG. 1, and may adjust a method of producing command values according to the control policies when producing command values through the virtual physical system.

In an embodiment, the control policies may include a distance prioritization policy.

If prediction data of the distribution network management apparatus 100 predicts the occurrence of the variability in a section of the first distribution line 170 due to excessive power generation or insufficient power generation by one or more new renewable energy generation systems 130, the distribution network management apparatus 100 may select one or more energy routers disposed within a predetermined distance from a section of the first distribution line 170 from among the plurality of energy routers 140 according to the distance prioritization policy. In addition, the distribution network management apparatus 100 may produce command values for one or more energy routers, that is, command values causing one or more energy routers to absorb the variability in a section of the first distribution line 170, for the respective energy routers, and may transmit the same to the one or more energy routers.

Here, the command values transmitted to the respective energy routers may be differentiated by the separation distance between a section of the first distribution line 170 and one or more energy routers.

For example, if one or more energy routers are energy router $R_{1-1}$ to energy router $R_{1-3}$, if the separation distances to a section of the first distribution line 170 are 500 m for energy router $R_{1-1}$, 1 km for energy router $R_{1-2}$, and 1.5 km for energy router $R_{1-3}$, and if command values include the amounts of reception power of the energy routers for absorbing the variability in the section of the first distribution line 170, the distribution network management apparatus 100 may transmit a command value having the largest amount of reception power to energy router $R_{1-1}$, may transmit a command value having a medium amount of reception power to energy router $R_{1-2}$, and may transmit a command value having the smallest amount of reception power to energy router $R_{1-3}$.

In other words, the amount of reception power may be differentiated (reduced or increased) and produced in order of decreasing separation distance, and one or more command values including the same may be transmitted to the one or more energy routers.

In an embodiment, the control policies may include an available-resource prioritization policy.

In the prediction data of the distribution network management apparatus 100, if the variability in a section of the first distribution line 170 is predicted to be greater than that in another section thereof due to excessive power generation or insufficient power generation by one or more new renewable energy generation systems 130, the distribution network management apparatus 100 may select one or more energy routers of which the amounts of available resources are greater than or equal to a predetermined value from among the plurality of energy routers 140 according to the available-resource prioritization policy. Here, the distribution network management apparatus 100 may receive at least one piece of SOC information and information on the amount of real-time power generation from the plurality of energy routers 140, and may determine the amount of available resources in each of the plurality of energy routers 140 through at least one of the SOC information and the information on the amount of real-time power generation.

The distribution network management apparatus 100 may produce command values for one or more energy routers having the amount of available resources greater than or equal to a predetermined value, that is, command values causing one or more energy routers to absorb the variability in a section of the first distribution line 170, for the respective energy routers, and may transmit the same to the one or more energy routers.

Here, the command values transmitted to the respective energy routers may be differentiated by the amounts of available resources of one or more energy routers.

For example, if one or more energy routers are energy router $R_{1-1}$ to energy router $R_{1-3}$, if the amount of available resources of energy router $R_{1-1}$ is 50%, the amount of available resources of energy router $R_{1-2}$ is 80%, and the amount of available resources of energy router $R_{1-3}$ is 40%, and if command values include the amounts of reception power of the energy routers for absorbing the variability in the section of the first distribution line 170, the distribution network management apparatus 100 may transmit a command value having the largest amount of reception power to energy router $R_{1-2}$, may transmit a command value having a medium amount of reception power to energy router $R_{1-1}$, and may transmit a command value having the smallest amount of reception power to energy router $R_{1-3}$.

In other words, the amount of reception power may be differentiated (reduced or increased) and produced in decreasing order of the amount of available resources, and one or more command values including the same may be transmitted to the one or more energy routers.

In an embodiment, the control policies may include a policy of prioritization for distances and control success rates.

In the prediction data of the distribution network management apparatus 100, if the variability in a section of the first distribution line 170 is predicted to be greater than that in another section thereof due to excessive power generation or insufficient power generation in one or more new renewable energy generation systems 130, the distribution network management apparatus 100 may perform primary selection for two or more energy routers, which are disposed within a predetermined distance from a section of the first distribution line 170, from among a plurality of energy routers 140.

In addition, the distribution network management apparatus 100 may perform secondary selection for at least one energy router, of which the control success rate is greater than or equal to a predetermined value, from among the two or more energy routers 140.

Here, the distribution network management apparatus 100 may receive transmission/reception power state information from the plurality of energy routers 140.

In addition, the distribution network management apparatus 100 may determine control success rates for the respective energy routers 140 by comparing the command values transmitted to the respective energy routers 140 with the amounts of router power received from the respective energy routers 140 during a predetermined period of time.

For example, if the command value transmitted from the distribution network management apparatus 100 to any one of the energy routers is information on the amount of reception power, the distribution network management apparatus 100 may compare a plurality of pieces of information on the amount of reception power (command values) transmitted to any one energy router during a predetermined period of time with the amounts of router power received from the any one energy router in response thereto, respectively. According to this, if the difference between the amount of power corresponding to one piece of information on the amount of reception power and the amount of router power corresponding thereto is less than a predetermined value, it may be determined that the operation control of the any one energy router using one command value (information on the amount of reception power) was successful.

If the difference between the amount of power corresponding to one piece of information on the amount of reception power and the amount of router power corresponding thereto is greater than a predetermined value, it may be determined that the operation control of any one energy router using one command value (information on the amount of reception power) has failed.

The distribution network management apparatus 100 may determine a control success rate for a predetermined period of time or a control success rate for a predetermined number of times for each of the plurality of energy routers 140 through the above method. The predetermined number of times may be the number of times the distribution network management apparatus 100 transmits command values to the energy router.

The distribution network management apparatus 100, having performed secondary selection for one or more energy routers through the control success rates of the energy routers as described above, may produce command values for the respective energy routers in such a manner that the command values are differentiated by the control success rates of the one or more energy routers.

In an embodiment, the control policies may include an operating cost prioritization policy.

In the prediction data of the distribution network management apparatus 100, if the variability in a section of the first distribution line 170 is predicted to be greater than that in another section thereof due to excessive power generation or insufficient power generation in one or more new renewable energy generation systems 130, the distribution network management apparatus 100 may select one or more energy routers of which the operating costs are equal to or less than a predetermined value from among a plurality of energy routers 140 according to the operating cost prioritization policy. Here, the operating cost of the energy router may be the cost required for charging or discharging the energy storage system 141 connected to the energy router (e.g., the depreciation cost of the energy storage system in charging or discharging thereof) or the cost required for power generation of the distributed generation 143 connected to the energy router.

If the operating cost of the energy router is the cost required for charging or discharging, the distribution network management apparatus 100 may receive information on the number of charging and discharging operations of the energy storage systems 141 from the respective energy routers 140, and may produce the operating costs of the respective energy routers 140 through the information on the number of charging and discharging operations.

The distribution network management apparatus 100, having selected one or more energy routers of which the operating costs are equal to or less than a predetermined value as described above, may produce command values for the respective energy routers, which enable the one or more energy routers to absorb the variability in a section of the first distribution line 170, and may transmit the same to the one or more energy routers.

Here, the command values transmitted to the respective energy routers may be differentiated by the operating costs of the one or more energy routers.

In other words, among the one or more energy routers, a command value enabling absorption of a relatively large amount of variability may be transmitted to the energy router having a relatively low operating cost, and a command value enabling absorption of a relatively small amount of variability may be transmitted to the energy router having a relatively high operating cost.

In an embodiment, the control policy may be a policy of prioritization for the number of charging and discharging operations.

In the prediction data of the distribution network management apparatus 100, if the variability in a section of the first distribution line 170 is predicted to be greater than that in another section thereof due to excessive power generation or insufficient power generation in one or more new renewable energy generation systems 130, the distribution network management apparatus 100 may select one or more energy routers, to which the energy storage system having the number of charging and discharging operations equal to or less than a predetermined value, from among a plurality of energy routers 140 $R_{1-1}$ to $R_{1-2}$ according to the policy of prioritization for the number of charging and discharging operations. Here, the distribution network management apparatus 100 may receive the number of charging and discharging operations of the energy storage system 141 from each of the plurality of energy routers 140.

The distribution network management apparatus 100, having selected one or more energy routers in which the number of charging and discharging operations of the energy storage system is equal to or less than a predetermined value as described above, may produce command values for the respective energy routers, which enable the one or more energy routers to absorb the variability in a section of the first distribution line 170, and may transmit the same to the one or more energy routers.

As described above, if there is a large amount of variability in a section of the first distribution line 170, the distribution network management apparatus 100 may determine the degree of aging of the energy storage system 141 through the number of charging and discharging operations of the energy storage system 141 connected to each of the plurality of energy routers 140, and may select one or more energy routers to which an energy storage system capable of absorbing a large amount of variability due to a low degree of aging is connected.

Here, the command values transmitted to the respective energy routers may be differentiated by the numbers of charging and discharging operations of one or more energy routers.

In other words, the distribution network management apparatus 100 may produce the amount of reception power or the amount of transmission power by differentiating (reducing or increasing) the same depending on the number of charging and discharging operations, and may transmit one or more command values including the same to the one or more energy routers.

In an embodiment, the control policy may be a world oil price linked policy.

In the prediction data of the distribution network management apparatus 100, if the variability in a section of the first distribution line 170 is predicted to be greater than that in another section thereof due to excessive power generation or insufficient power generation in one or more new renewable energy generation systems 130, the distribution network management apparatus 100 may preferentially select one or more energy routers in which the new renewable energy generation system is connected to the distributed generation 143 from among a plurality of energy routers 140 according to the world oil price linked policy when the world oil price increases to a predetermined value or more.

The distribution network management apparatus 100 may produce a command value for each of one or more energy routers in which the new renewable energy generation system is connected to the distributed generation 143, and may transmit the same to the one or more energy routers.

As described above, the distribution network management apparatus 100 may adjust a method of producing the command values transmitted to one or more energy routers depending on the control policies.

Meanwhile, if an end section of the first distribution line 170 is included in some sections of the first distribution line 170 in which the variability occurs, the distribution network management apparatus 100 may produce a command value for an energy router 195 $R_b$ linking the first distribution line 170 and the second distribution line 180, that is, a command value enabling the second distribution line 180 to absorb the variability that occurs in a section of the first distribution line 170, and may transmit the same to the energy router 195.

Although the above embodiment illustrates the configuration in which the distribution network management apparatus 100 produces the command values only for one or more energy routers among a plurality of energy routers 140 $R_{1-1}$ to $R_{1-N}$, the command values for energy routers other than the one or more energy routers (the command values for managing the distribution network in ordinary times) may also be produced in the actual application. In addition, the distribution network management apparatus 100 may also produce command values both for one or more energy storage systems 135 and for one or more new renewable energy generation systems 130, which are connected to the first distribution line 170.

As described above, the distribution network management apparatus 100 may process monitoring data received from a plurality of sensors 210, and may input the processed data to a virtual physical system to produce command values for energy routers, thereby automatically performing the control such that the energy routers absorb the variability of the distribution network.

In other words, the distribution network management apparatus 100 may automatically produce command values for stably maintaining the distribution network using a virtual physical system, and may control the energy routers capable of bidirectional power conversion using the command values, thereby automatically performing the process of stably maintaining the distribution network.

Hereinafter, elements of the distribution network management apparatus 100 according to the embodiment will be described.

Figure 3:
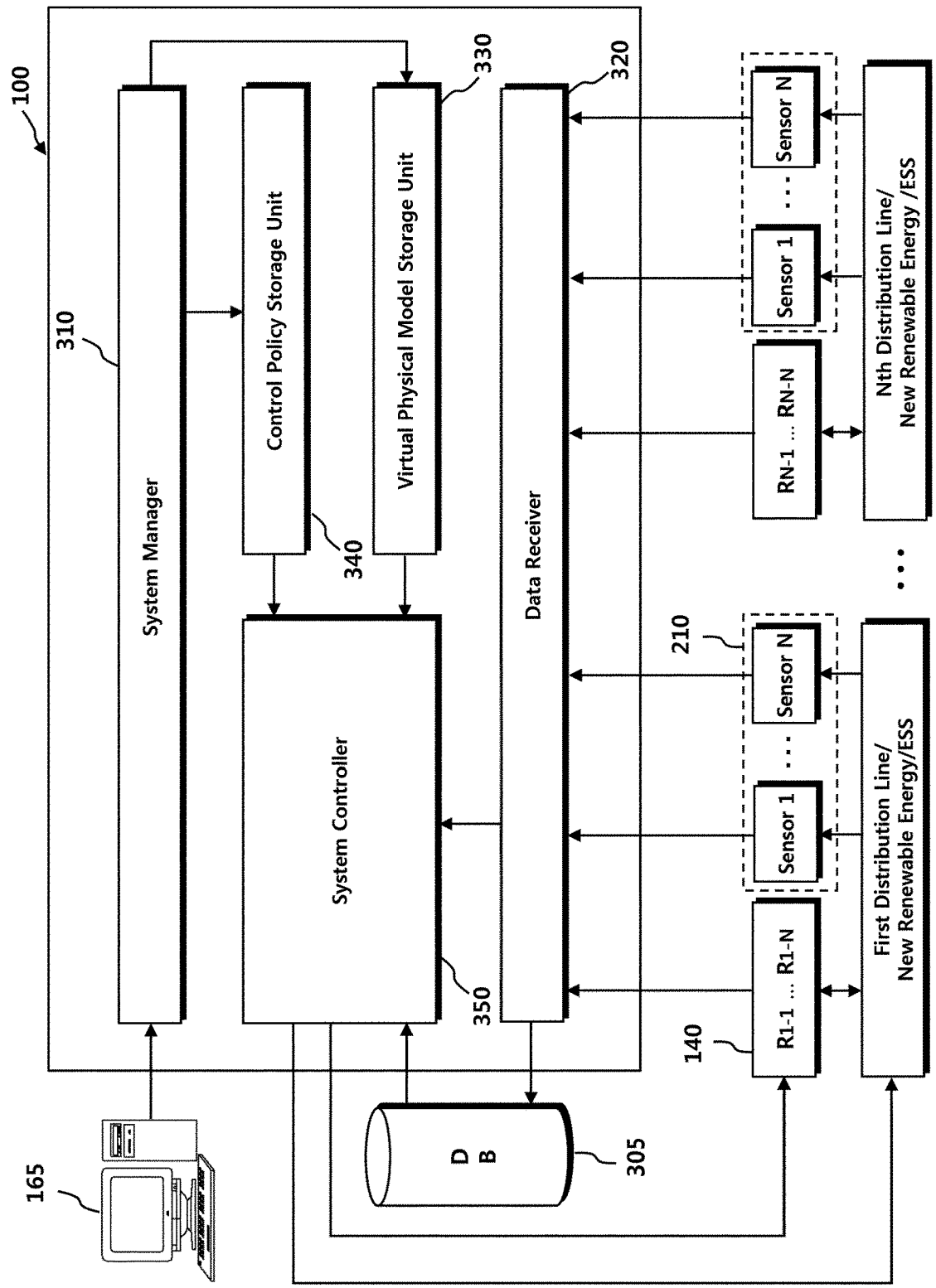
FIGS. 3 and 4 are diagrams illustrating the configuration of a distribution network management apparatus according to an embodiment.
Figure 4:
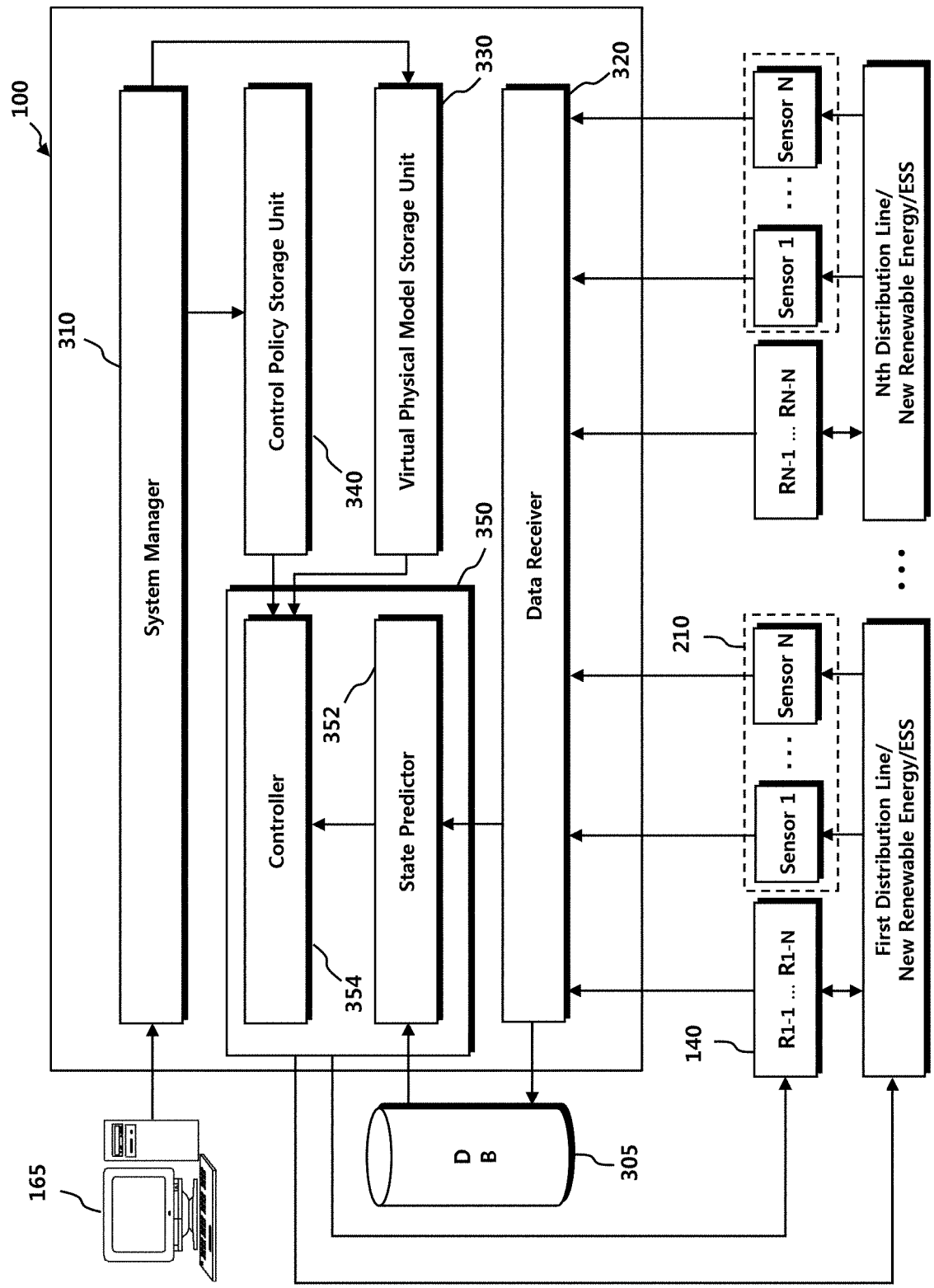

FIGS. 3 and 4 are diagrams illustrating the configuration of a distribution network management apparatus according to an embodiment.

Referring to FIG. 3, a distribution network management apparatus 100 may include a system manager 310, a data receiver 320, a virtual physical model storage unit 330, a control policy storage unit 340, and a system controller 350. In addition, the distribution network management apparatus 100 may store data, which is received from the outside of the apparatus or is generated therein, in an external database (DB) server 305.

The system manager 310 may receive virtual physical model data and control policies from the manager terminal device 165.

In addition, the system manager 310 may transmit the virtual physical model data to the virtual physical model storage unit 330, and may transmit the control policies to the control policy storage unit 340.

The data receiver 320 may receive monitoring data from a plurality of sensors arranged in a distribution network to which a plurality of unpredictable power generation systems are connected, that is, a plurality of sensors 210 installed in the first distribution line 170 included in the distribution network, one or more new renewable energy generation systems 130 that are unpredictable power generation systems connected to the first distribution line 170, and one or more energy storage systems 135. Here, the monitoring data may include at least one piece of information on the power generation states of one or more new renewable energy generation systems 130, information on the state of each line section of the first distribution line 170, and information on the charging/discharging states of one or more energy storage systems 135.

In addition, the data receiver 320 may receive, from each of the plurality of energy routers 140, at least one piece of information om the amount of router power of the energy router for the first distribution line 170, state-of-charge (SOC) information on the energy storage system 141 connected to each of the plurality of energy routers, and information on the number of charging and discharging operations of the energy storage system 141 connected to each of the plurality of energy routers.

In addition, the data receiver 320 may receive information on the amount of real-time power generation of the distributed generation 143 from the energy router to which the distributed generation 143 is connected.

In addition, the data receiver 320 may further receive, from an external system, weather information on the respective regions where one or more new renewable energy generation systems 130 are located.

Here, the data receiver 320 may perform data pre-processing, data categorizing, and the like on the monitoring data received from the plurality of sensors 210, and may transmit monitoring data, on which data pre-processing, data categorizing, and the like have been performed, to the system controller 350, which will be described below.

The data receiver 320 may include at least one of a wired communication module and a wireless communication module, and may perform at least one of wired communication and wireless communication with the plurality of sensors 210 and the plurality of energy routers 140. Here, the wired communication module may be a network interface card (NIC) module or the like, and the wireless communication module may be a Wi-Fi communication module, a Long-Term Evolution (LTE) communication module, a 5G communication module, or the like.

The virtual physical model storage unit 330 stores virtual physical model data on the distribution network, that is, virtual physical model data on the first distribution line 170, one or more new renewable energy generation systems 130, one or more energy storage systems 135, and a plurality of energy routers 140.

The virtual physical model storage unit 330 may receive the virtual physical model data from the system manager 310, and may store the same.

Here, the virtual physical model data may be data constituting a virtual physical system, that is, digital copies of physical objects such as the first distribution line 170, one or more new renewable energy generation systems 130, one or more energy storage system 135, and a plurality of energy routers 140, which may indicate model data obtained by virtualizing the physical objects.

The control policy storage unit 340 may store control policies for a plurality of energy routers 140.

The control policy storage unit 340 may receive control policies from the system manager 310, and may store the same.

Here, the control policies may include at least one of a distance prioritization policy, an available-resource prioritization policy, a policy of prioritization for distances and control success rates, an operating cost prioritization policy, a policy of prioritization for the number of charging and discharging operations, and a world oil price linked policy.

The system controller 350 may manage such that the voltage and the frequency of the power distributed to the distribution line, to which one or more new renewable energy generation systems 130 are connected, do not fall outside of an rated voltage range (e.g., 380 V±α or 220 V±α) and an rated frequency range (e.g., 60 Hz±β), respectively.

In other words, the system controller 350 may generate processed data of the monitoring data received in the data receiver 320, and may input the processed data into a virtual physical system of the distribution network, thereby producing command values for one or more of the plurality of energy routers 140. In addition, the system controller 350 may transmit the produced command values to the one or more energy routers.

A more detailed description thereof is as follows.

Referring to FIG. 4, the system controller 130 may include a state predictor 352 and a controller 354.

The state predictor 352 may generate processed data of the monitoring data received from the data receiver 320.

In other words, the state predictor 352 may generate prediction data on the state of the first distribution line 170, that is, the distribution network, after a predetermined period of time using the monitoring data.

Here, since the amount of power generation in one or more new renewable energy generation systems 130 varies depending on the weather, the state predictor 352 may receive weather information on respective regions where one or more new renewable energy generation systems 130 are located through the data receiver 320, and when generating prediction data using monitoring data, the weather information may be further used.

The controller 354 may produce command values for one or more energy routers among the plurality of energy routers 140 by inputting the processed data generated by the state predictor 352 into a virtual physical system, that is, by substituting the processed data into variables of the virtual physical model data constituting the virtual physical system.

In addition, the controller 354 may transmit the produced command values to one or more energy routers.

When the controller 354 inputs the processed data into the virtual physical system and produces the command values as described above, the controller 354 may adjust a method of producing the command values depending on the control policies stored in the control policy storage unit 340.

In an embodiment, in the case where the control policies include a distance prioritization policy, the controller 354 may select one or more energy routers disposed within a predetermined distance from a section of the first distribution line 170 from among a plurality of energy routers 140.

In addition, the command values may be produced for the respective energy routers in such a manner that the command values are differentiated by separation distances between a section of the first distribution line 170 and one or more energy routers.

In an embodiment, in the case where the control policies include an available-resource prioritization policy, the controller 354 may select one or more energy routers, of which the amount of available resources is greater than or equal to a predetermined value, from among a plurality of energy routers 140.

In addition, the controller 354 may produce command values for the respective energy routers in such a manner that the command values are differentiated by the amounts of available resources of one or more energy routers.

In an embodiment, in the case where the control policies include a distance-and-control success rate prioritization policy, the controller 354 may perform primary selection for two or more energy routers, which are arranged within a predetermined distance from a section of the first distribution line 170, from among a plurality of energy routers 140 $R_{1-1}$ to $R_{1-N}$.

In addition, the controller 354 may perform secondary selection for at least one energy router of which the control success rate is greater than or equal to a predetermined value from among the two or more energy routers.

The controller 354 may produce command values for the respective energy routers in such a manner that the command values are differentiated by the control success rates of the one or more energy routers.

In an embodiment, in the case where the control policies include an operating cost prioritization policy, the controller 354 may select one or more energy routers, of which the operating costs are equal to or less than a predetermined value, from among a plurality of energy routers 140.

Then, the controller 354 may produce command values for the respective energy routers in such a manner that the command values are differentiated by the operating costs of the one or more energy routers.

In an embodiment, in the case where the control policies include a policy of prioritization for the number of charging and discharging operations, the controller 354 may select one or more energy routers, of which the numbers of charging and discharging operations are equal to or less than a predetermined value, from among a plurality of energy routers 140.

Then, the controller 354 may produce command values for the respective energy routers in such a manner that the command values are differentiated by the numbers of charging and discharging operations of the one or more energy routers.

In an embodiment, if the control policies include a world oil price linked policy, and if the oil price increases to a predetermined value or more, the controller 354 may preferentially select one or more energy routers, in which a new renewable energy generation system is connected to the distributed generation 143, from among a plurality of energy routers 140.

In addition, the controller 354 may produce command values of one or more energy routers for the respective energy routers, and may transmit the same to the one or more energy routers.

As described above, the controller 354 may adjust a method of producing command values transmitted to one or more energy routers depending on the control policies.

Meanwhile, if an end section of the first distribution line 170 is included in some sections of the first distribution line 170 in which the variability occurs, the controller 354 may produce a command value for an energy router 195 linking the first distribution line 170 and the second distribution line 180, that is, a command value enabling the second distribution line 180 to absorb the variability that occurs in a section of the first distribution line 170, and may transmit the same to the energy router 195.

Although the embodiment illustrates the configuration in which the controller 354 produces the command values only for one or more energy routers among a plurality of energy routers 140, the command values for energy routers other than the one or more energy routers (the command values for managing a distribution network in ordinary times) may also be produced in the actual application. In addition, the controller 354 may also produce the command values both for one or more energy storage systems 135 and for one or more new renewable energy generation systems 130, which are connected to the first distribution line 170.

Hereinafter, a process of the distribution network management apparatus 100 managing a distribution network will be described.

Figure 5:
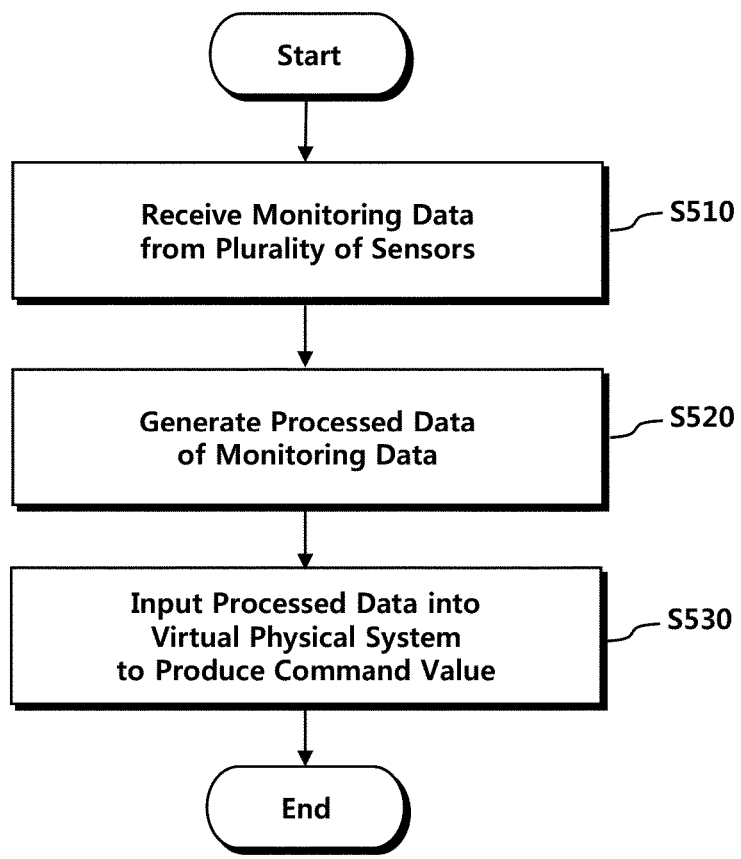
FIG. 5 is a flowchart illustrating a process of managing a distribution network in a distribution network management apparatus according to an embodiment.

FIG. 5 is a flowchart illustrating a process of managing a distribution network in a distribution network management apparatus according to an embodiment.

Referring to FIG. 5, the distribution network management apparatus 100 receives monitoring data from a plurality of sensors 210 arranged in a distribution network to which a plurality of new renewable energy generation systems 130 that are unpredictable power generation systems are connected (S510). Here, the monitoring data may include at least one piece of information on the power generation states of one or more new renewable energy generation systems 130, information on the state of each line section of the first distribution line 170, and information on the charging/discharging states of one or more energy storage systems 135.

The distribution network management apparatus 100 having received the monitoring data generates processed data, which is prediction data on the state of the distribution network after a predetermined period of time, using the monitoring data (S520). Here, the distribution network management apparatus 100 may perform data pre-processing, data categorizing, and the like on the monitoring data, thereby generating processed data.

The distribution network management apparatus 100 inputs the processed data into a virtual physical system and produces command values for a plurality of energy routers 140, that is, command values for one or more energy routers among the plurality of energy routers 140 (S530). Here, the distribution network management apparatus 100 may adjust a method of producing the command values depending on the previously stored control policies as described above.

Up till now, the description has been made of a distribution network management system that produces command values for bidirectional power conversion of energy routers through a virtual physical system for a distribution network in such a manner that the command values are produced according to control policies, thereby efficiently managing the distribution network.

Hereinafter, a description will be made of a distribution network management system that transmits command values for bidirectional power conversion of energy routers, which absorb the variability of a distribution network, to the energy routers while adjusting communication cycles of the command values depending on the states of the energy routers, thereby efficiently managing the distribution network.

Figure 6:
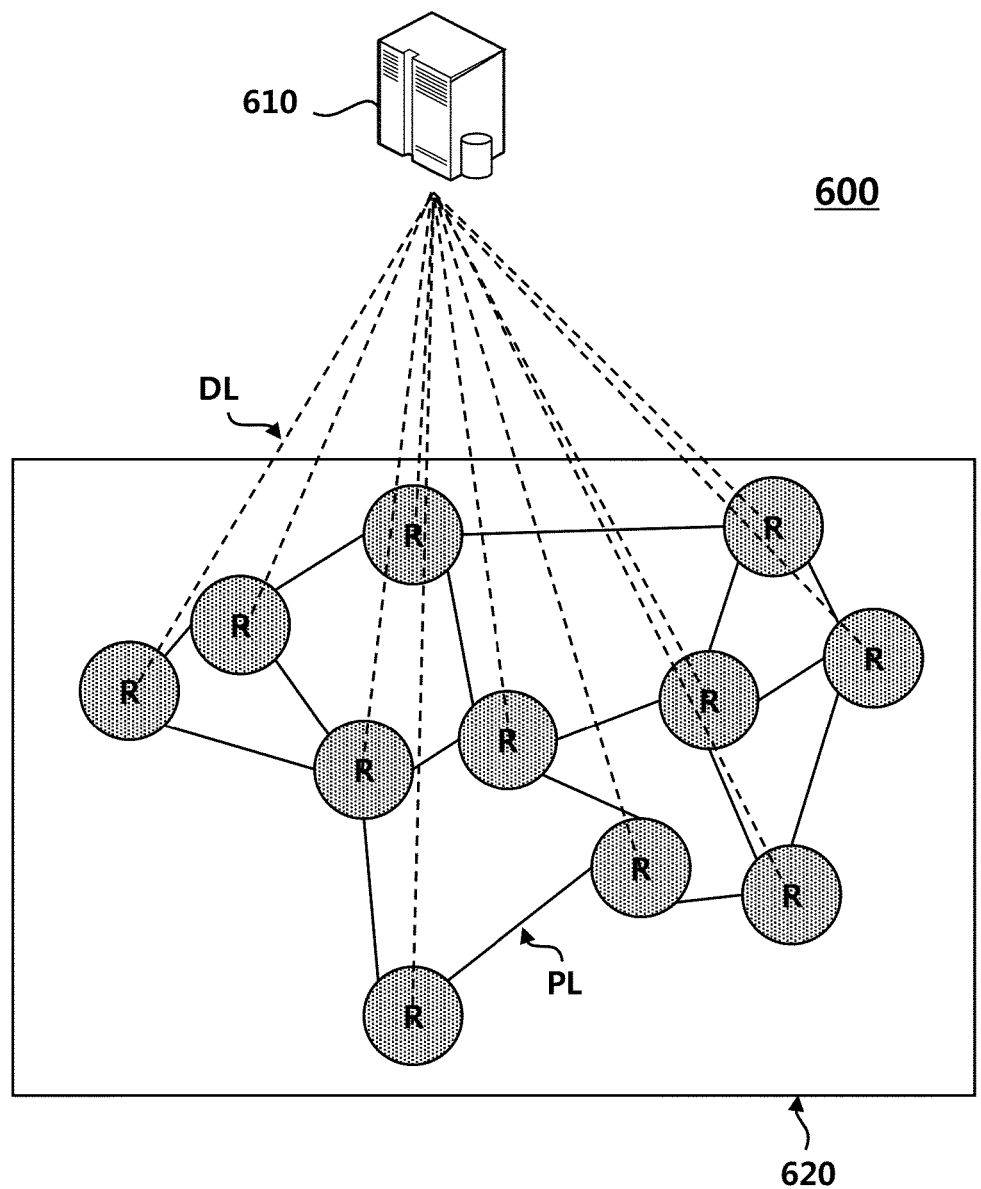
FIG. 6 is a diagram illustrating the configuration of a distribution network management system according to another embodiment.

FIG. 6 is a diagram illustrating the configuration of a distribution network management system according to another embodiment.

Referring to FIG. 6, the distribution network management system 600 may include a distribution network management apparatus 610 and a plurality of energy routers 620. Here, the plurality of energy routers 620 according to another embodiment may be energy routers arranged in a distribution network including a first distribution line 170 other than the first distribution line 170 described in the above embodiment, and may be energy routers that absorb the variability of the distribution network.

The distribution network management apparatus 610 may input processed data to the configuration described in the embodiment, that is, a virtual physical system for the distribution network, thereby producing command values for a plurality of energy routers 620 arranged in the distribution network, and may transmit the produced command values to the plurality of energy routers 620. In another embodiment, for the convenience of description, the operation of inputting the processed data to a virtual physical system for the distribution network and producing the command values for the respective energy routers 620 is defined as a "processing optimization operation".

Here, the distribution network management apparatus 610 may produce command values for a plurality of energy routers 620 according to the cycle of a processing optimization operation, and may transmit the command values for a plurality of energy routers 620 to the respective energy routers 620 according to communication cycles. Here, the distribution network management apparatus 610 may transmit the command values to the plurality of energy routers 620 through data lines DL for data communication.

In another embodiment, the distribution network management apparatus 610 may identify the state of a plurality of energy routers 620, and may adjust the communication cycle of at least one energy router among the plurality of energy routers 620 depending on the state of each of the plurality of energy routers 620.

A detailed description thereof will be made below.

First, the distribution network management apparatus 610 may transmit command values for the amounts of router power produced according to the variability of a distribution network to a plurality of energy routers 620 while adjusting the communication cycle of the command value according to a control success rate of the energy router for the command value.

Specifically, the distribution network management apparatus 610 may recognize one or more sections in which the variability occurred among a plurality of sections included in the distribution network, and may identify a plurality of energy routers 620 related to the one or more sections, among all of the energy routers arranged in the distribution network.

In addition, the distribution network management apparatus 610 produces initial command values for the respective energy routers through a first execution of the processing optimization operation, and transmits the initial command values to the plurality of energy routers 620.

Thereafter, the distribution network management apparatus 610 may receive the actual amounts of router power for the initial command values from the respective energy routers 620, and may compare the initial command values with the actual amounts of router power for the respective energy routers 620, thereby producing control success rates for the respective energy routers 620.

Meanwhile, the distribution network management apparatus 610 may receive control success rates from the respective energy routers 620.

The distribution network management apparatus 610, having produced or received the control success rates of the respective energy routers 620 as described above, may adjust the communication cycle of the command value for at least one energy router among the plurality of energy routers 620 to be different from a communication cycle according to the control success rate for each energy router.

Here, the cycle of the processing optimization operation (the operation cycle) may be constant, and the distribution network management apparatus 610 may adjust the communication cycles for one or more energy routers such that the communication cycles are N times the operation cycle (N is a positive rational number).

Figure 7:
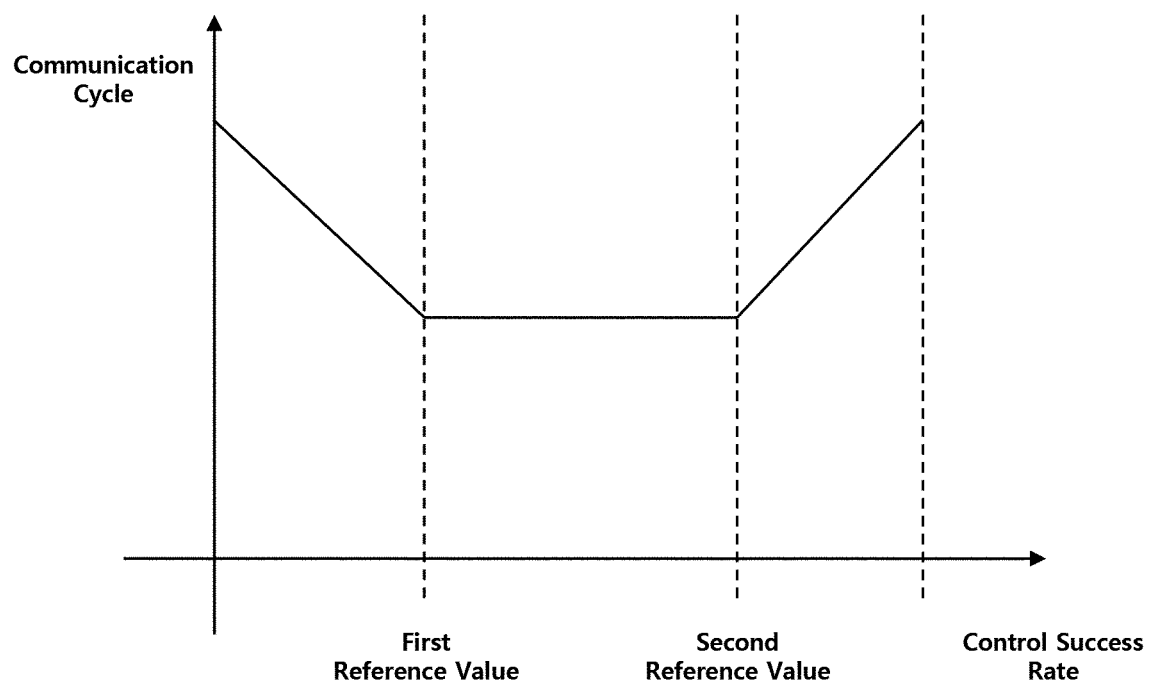
FIG. 7 is a diagram for explaining a configuration of adjusting a communication cycle depending on a control success rate of an energy router in another embodiment.

In other words, the distribution network management apparatus 610, as shown in FIG. 7, makes an adjustment such that the communication cycle for transmission of the command value is shortened as the control success rate increases regarding one or more energy routers of which the control success rates are less than a first reference value, among the plurality of energy routers 620.

Here, since the energy router having a very low control success rate, among the one or more energy routers of which the control success rates are less than a first reference value, is highly likely to have a very low control success rate in the future, it is difficult to control the energy router using the command value. Therefore, the communication cycle of the energy router among the one or more energy routers may be adjusted to be relatively long in order to reduce the amount of computation of the distribution network management apparatus 610.

On the other hand, since the energy router having a relatively high control success rate, among the one or more energy routers of which the control success rates are less than the first reference value, may be controlled to some extent through the command value, the distribution network management apparatus 610 may make an adjustment such that the communication cycle of the energy router is shortened as the control success rate of the energy router increases, among the one or more energy routers of which the control success rates are less than the first reference value, thereby controlling the state of the energy router while frequently identifying the same.

Meanwhile, the distribution network management apparatus 610 may maintain normal communication cycles for one or more energy routers of which the control success rates are between the first reference value and the second reference value.

In addition, the distribution network management apparatus 610 may adjust the communication cycles of one or more energy routers, having the control success rates greater than or equal to the second reference value, to be prolonged as the control success rates increase.

In other words, since the control success rate greater than or equal to the second reference value indicates that the energy router thereof is able to be accurately controlled through the command value, the distribution network management apparatus 610 does not need to frequently identify the state of the energy router. Therefore, the distribution network management apparatus 610 may make an adjustment such that the higher the control success rate of the energy router, the longer the communication cycle of the energy router, among the one or more energy routers of which the control success rates are greater than or equal to the second reference value, thereby reducing the amount of computation of the distribution network management apparatus 610.

As described above, the distribution network management apparatus 610 may adjust the communication cycles of one or more energy routers, having control success rates less than the first reference value, to be longer than the normal communication cycles thereof as the control success rates are reduced, and may adjust the communication cycles of one or more energy routers, having control success rates greater than or equal to the second reference value, to be longer than the normal communication cycles thereof as the control success rates increase.

Here, since the normal communication cycle may be the same as the cycle of the processing optimization operation for producing the command value, the communication cycles of one or more energy routers, which are adjusted to be longer than the normal communication cycles depending on the high or low control success rate, will be longer than the operation cycle.

In this case, with regard to the processing optimization operation performed between the communication cycles of one or more energy routers, which are adjusted to be longer than normal communication cycles, the distribution network management apparatus 610 may exclude the energy router having an extremely low control success rate from the processing optimization operation, and may fixedly input an existing command value for the energy router having an extremely high control success rate in the processing optimization operation.

In other words, in the case of performing only the processing optimization operation on one or more energy routers prior to the communication cycles with the one or more energy routers having control success rates less than the first reference value, the distribution network management apparatus 610 may exclude the energy router having a control success rate equal to or less than a low value, which is lower than the first reference value by K (K is a rational number), from the processing optimization operation, thereby reducing the amount of computation of the distribution network management apparatus 610.

In the case of performing only the processing optimization operation on one or more energy routers prior to the communication cycles with the one or more energy routers having control success rates greater than or equal to the second reference value, the distribution network management apparatus 610 may process the energy router having a control success rate greater than or equal to a high value, which is higher than the second reference value by M (M is a rational number), using a fixed value in the processing optimization operation, thereby reducing the amount of computation of the distribution network management apparatus 610.

Meanwhile, among one or more energy routers having control success rates less than the first reference value, the distribution network management apparatus 610 may exclude the energy router, which has a control success rate equal to or less than a low value for a predetermined period of time, from the plurality of energy routers 620, and may put the same into a maintenance mode.

In addition, among one or more energy routers having control success rates less than the first reference value, the distribution network management apparatus 610 may also exclude the energy router of which the control success rates for the command values transmitted during a predetermined number of communication cycles, that is, a predetermined number of communication cycles, are equal to or less than a low value from the plurality of energy routers 620, and may put the same into a maintenance mode.

In the above embodiment, the configuration of the distribution network management apparatus 610 adjusting the communication cycles of the command values for the respective energy routers 620 depending on the control success rates of the respective energy routers 620 for the command values has been described.

In addition, the distribution network management apparatus 610 may adjust the communication cycles of the command values depending on the amounts of available resources of the respective energy routers 620.

In other words, the distribution network management apparatus 610 may recognize one or more sections in which the variability has occurred, among a plurality of sections included in the distribution network, and may identify a plurality of energy routers 620 related to the one or more sections, among all of the energy routers arranged in the distribution network.

In addition, the distribution network management apparatus 610 may produce the amount of available resources by receiving information on the amount of available resources from each of the plurality of energy routers 620 or by receiving SOC information on the energy storage system or information on the amount of real-time power generation of the distributed generation from each of the plurality of energy routers 620, and may adjust the communication cycle of a command value for each of the plurality of energy routers 620 depending on the amount of available resources of each of the plurality of energy routers 620.

For example, the distribution network management apparatus 610 may adjust the communication cycle in proportion to the amount of available resources. In other words, the distribution network management apparatus 610 may adjust the communication cycle of a command value to be shortened as the amount of available resources of the energy router is reduced, and may adjust the communication cycle of the command value to be prolonged as the amount of available resources of the energy router increases. Here, the distribution network management apparatus 610 may exclude the energy router having an extremely small amount of available resources from the plurality of energy routers 620, that is, may exclude the energy router from the control targets, or may exclude the same at least once from the processing optimization operation.

The distribution network management apparatus 610, having adjusted the communication cycle of the command value for each of the plurality of energy routers 620 depending on the amount of available resources as described above, may produce command values through the processing optimization operation, and may transmit the command values according to the communication cycles of the respective energy routers 620.

Meanwhile, the distribution network management apparatus 610 may adjust the communication cycle of the command value depending on the magnitudes of variability in line sections of a plurality of energy router-neighboring areas adjacent to the positions where the respective energy routers 620 are located.

In other words, the distribution network management apparatus 610 may recognize one or more sections in which the variability occurs, among a plurality of sections included in the distribution network, and may identify a plurality of energy routers 620 adjacent to the one or more sections, among all of the energy routers arranged in the distribution network.

In addition, the distribution network management apparatus 610 may produce initial command values of the respective energy routers 620 through initial execution of the processing optimization operation, and may transmit the same to the plurality of energy routers 620.

Thereafter, the distribution network management apparatus 610 may receive monitoring data from a plurality of sensors arranged in the distribution network, may identify the current magnitudes of variability or predicted magnitudes of variability in the line sections of the plurality of energy router-neighboring areas, and may adjust the communication cycles of the command values of the respective energy routers 620 depending on the current magnitudes of variability or the predicted magnitudes of variability.

For example, the distribution network management apparatus 610 may adjust the communication cycle in inverse proportion to the magnitude of variability. In other words, distribution network management apparatus 610 may adjust the communication cycle of the command value for at least one energy router arranged in the energy router-neighboring area, in which the magnitude of variability is greater than or equal to a predetermined value, to be shorter, and may adjust the communication cycle of the command value for at least one energy router arranged in the energy router-neighboring area in which the magnitude of variability is less than a predetermined value, to be longer.

The distribution network management apparatus 610, having adjusted the communication cycle of the command value for each of the plurality of energy routers 620 depending on the magnitude variability in the energy router-neighboring area as described above, may produce command values through the processing optimization operation, and may transmit the command values according to the communication cycles of the respective energy routers 620.

The plurality of energy routers 620 may be arranged to be dispersed in the distribution network, may periodically receive command values from the distribution network management apparatus 610 through data lines DL, and may perform control such that the amount of router power flowing between the distribution network and the internal resources (e.g., the energy storage system, the distributed power supply, etc.) conforms to the command value. In other words, the plurality of energy routers 620 may receive power from the distribution network according to the command value, may convert the received power, and may transmit the converted power to the energy storage system, or may receive power from the energy storage system or the distributed generation according to the command value, may convert the received power, and may transmit the converted power to the distribution network.

Here, there may be a difference between the command value and the actual amount of router power for each energy router depending on the performance of each of the plurality of energy routers 620.

Each of the plurality of energy routers 620 may transmit and receive power to and from each other through power lines PL.

In addition, the plurality of energy routers 620 may transmit an actual amount of router power to the distribution network management apparatus 610 through the data lines DL, or may produce a control success rate by comparing the amount of router power corresponding to the command value with the actual amount of router power, thereby transmitting the control success rate to the distribution network management apparatus 610 through the data lines DL.

In addition, the plurality of energy routers 620 may produce the amount of available resources by monitoring internal resources, that is, by measuring SOC of the energy storage system, the amount of real-time power generation of the distributed generation, and the like, and may transmit the amount of available resources to the distribution network management apparatus 610 through the data lines DL, or may transmit SOC information of the energy storage system, information on the amount of real-time power generation of the distributed generation, and the like to the distribution network management apparatus 610.

Hereinafter, a process of adjusting the communication cycles of the command values depending on the states of a plurality of energy routers 620 in the distribution network management system 600 will be described.

Figure 8:
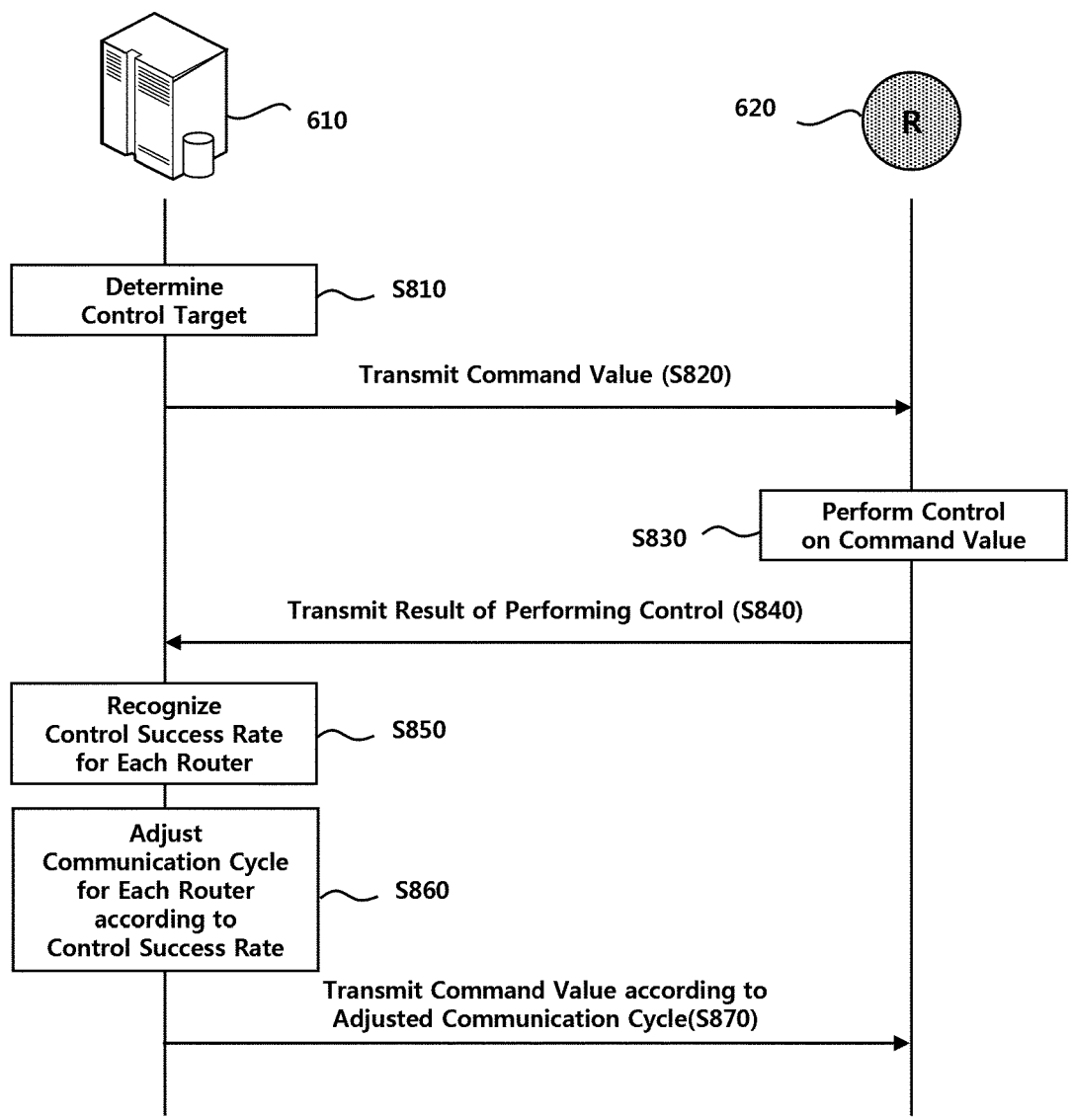
FIG. 8 is a flowchart illustrating a process of adjusting communication cycles of command values depending on control success rates of a plurality of energy routers in a distribution network management system according to another embodiment.

FIG. 8 is a flowchart illustrating a process of adjusting communication cycles of command values depending on control success rates of a plurality of energy routers in a distribution network management system according to another embodiment.

First, the distribution network management apparatus 610 may recognize one or more sections in which the variability occurs among a plurality of sections included in the distribution network, and may identify a plurality of energy routers 620 related to the one or more sections, among all of the energy routers arranged in the distribution network, that is, may determine targets to be controlled (S810).

In addition, the distribution network management apparatus 610 produces initial command values for respective energy routers through initial execution of the processing optimization operation and transmits the initial command values to the plurality of energy routers 620 (S820).

The plurality of energy routers 620 having received the initial command values may receive power from the distribution network according to the initial command values, may convert the received power, and may transmit the converted power to the energy storage system, or may receive power from the energy storage system or the distributed generation according to the initial command values, may convert the received power, and may transmit the converted power to the distribution network, thereby measuring an actual amount of router power therefor (S830).

In addition, the plurality of energy routers 620 may transmit the actual amount of router power to the distribution network management apparatus 610, or may produce a control success rate by comparing the amount of router power corresponding to the command value with an actual amount of router power, thereby transmitting the control success rate to the distribution network management apparatus 610 (S840).

The distribution network management apparatus 610 may compare the initial command value with the actual amount of router power for each of the plurality of energy routers 620, thereby producing a control success rate for each of the plurality of energy routers 620, or may receive the control success rate from each of the plurality of energy routers 620, thereby recognizing the control success rate for each of the plurality of energy routers 620 (S850).

The distribution network management apparatus 610, having recognized the control success rate for each of the plurality of energy routers 620, adjusts the communication cycle of the command value for at least one energy router among the plurality of energy routers 620 to be different from the normal communication cycle according to the control success rate for each energy router (S860).

The distribution network management apparatus 610, as shown in FIG. 7, may adjust the communication cycle for transmission of the command value to be shortened as the control success rate increases regarding one or more energy routers of which the control success rates are less than a first reference value, among the plurality of energy routers 620.

In other words, the distribution network management apparatus 610 may adjust the communication cycles of one or more energy routers having control success rates less than the first reference value to be longer than the normal communication cycle as the control success rates are reduced.

In addition, the distribution network management apparatus 610 may adjust the communication cycles of one or more energy routers having control success rates greater than or equal to a second reference value to be prolonged as the control success rates increase.

Meanwhile, the distribution network management apparatus 610 may maintain the normal communication cycles for one or more energy routers having control success rates between the first reference value and the second reference value.

The distribution network management apparatus 610, having adjusted the communication cycles of the command values of the plurality of energy routers 620 according to the control success rates as described above, transmits the command values for the respective energy routers 620 to the respective corresponding energy routers according to the adjusted communication cycles (S870).

The distribution network management system 600 may repeatedly perform operations S830 to S870, and the distribution network management apparatus 610 may select an energy router of which the control success rate is equal to or less than a low value, which is lower than the first reference value by K (K is a rational number), for a predetermined period of time, from among one or more energy routers having control success rates less than a first reference value through the repeated execution of operations S830 to S870, and may exclude the above energy router from the plurality of energy routers 620 and put the same into a maintenance mode.

In addition, the distribution network management apparatus 610 may select an energy router of which the control success rates for the command values transmitted during a predetermined number of communication cycles, that is, for a predetermined number of command values, are equal to or less than a low value, which is lower than the first reference value, from among one or more energy routers having control success rates less than the first reference value through the repeated execution of operations S830 to S870, and may exclude the above energy router from the plurality of energy routers 620 and put the same into a maintenance mode.

Figure 9:
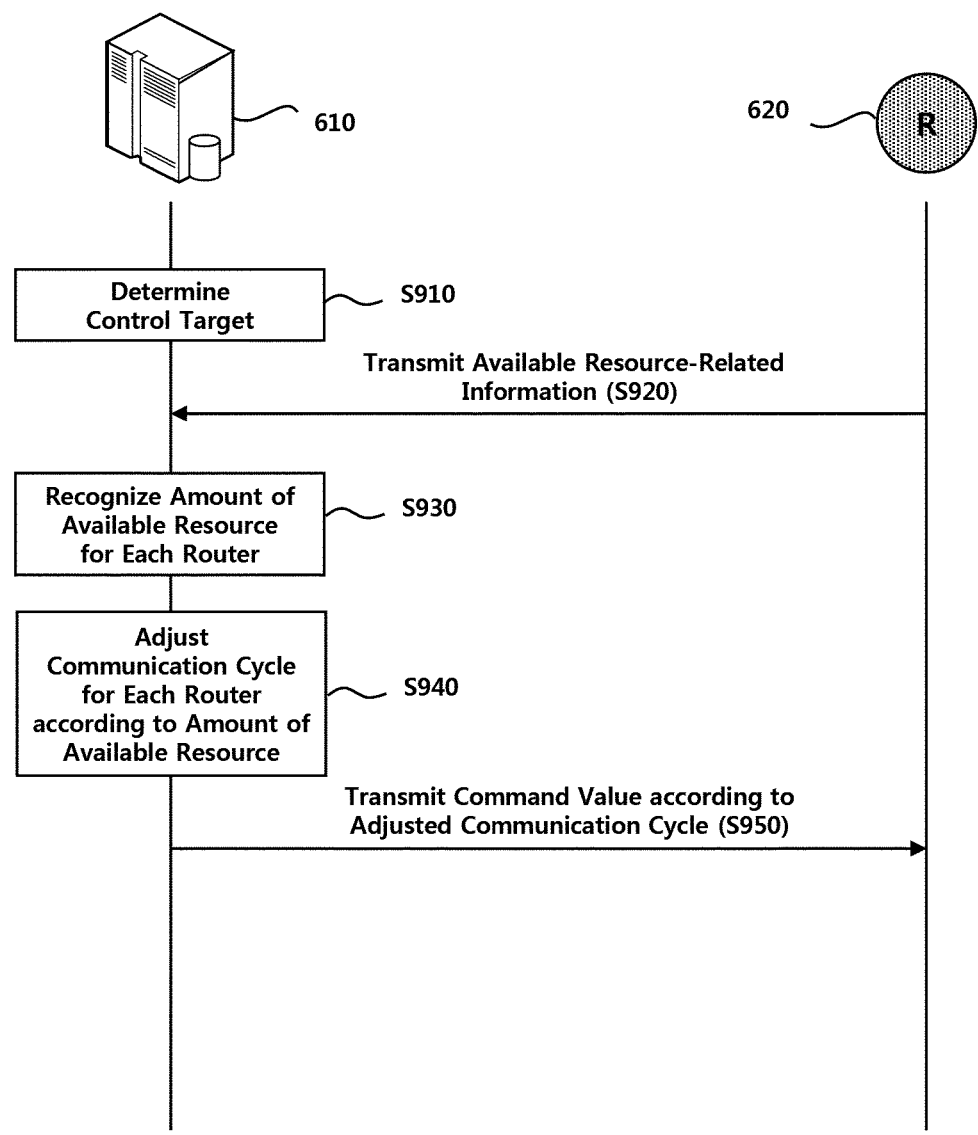
FIG. 9 is a flowchart illustrating a process of adjusting communication cycles of command values depending on the amounts of available resources of a plurality of energy routers in a distribution network management system according to another embodiment.

FIG. 9 is a flowchart illustrating a process of adjusting a communication cycle of a command value depending on the amounts of available resources of a plurality of energy routers in a distribution network management system according to another embodiment.

The distribution network management apparatus 610 may recognize one or more sections in which the variability occurs among a plurality of sections included in a distribution network, and may identify a plurality of energy routers 620 related to the one or more sections, among all of the energy routers arranged in the distribution network, that is, may determine targets to be controlled (S910).

In addition, the distribution network management apparatus 610 may produce the amount of available resources by receiving information on the amount of available resources from each of the plurality of energy routers 620 or by receiving SOC information on the energy storage system or information on the amount of real-time power generation of the distributed generation from each of the plurality of energy routers 620, thereby recognizing the amount of available resources of each of the plurality of energy routers 620 (S920 and S930).

Thereafter, the distribution network management apparatus 610 adjusts the communication cycle of the command value for each of the plurality of energy routers 620 according to the amount of available resources of each of the plurality of energy routers 620 (S940).

The distribution network management apparatus 610, having adjusted the communication cycle of the command value for each of the plurality of energy routers 620 depending on the amount of available resources as described above, transmits the command value of each of the plurality of energy routers 620 to each corresponding energy router according to the adjusted communication cycle (S950).

Figure 10:
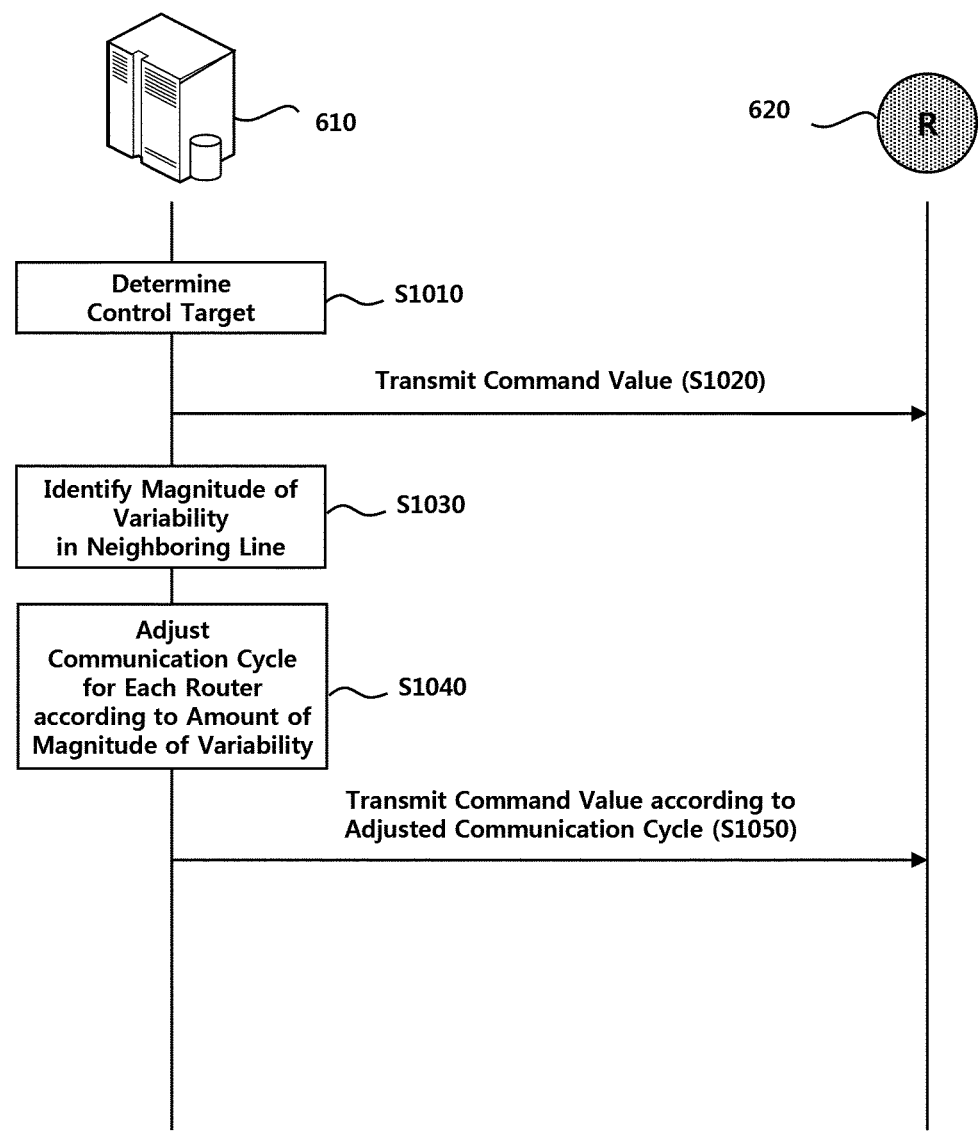
FIG. 10 is a flowchart illustrating a process of adjusting a communication cycle of a command value depending on the magnitude of variability in a neighboring area of a plurality of energy routers in a distribution network management system according to another embodiment.

FIG. 10 is a flowchart illustrating a process of adjusting a communication cycle of a command value depending on the magnitude of variability in a neighboring area of a plurality of energy routers in a distribution network management system according to another embodiment.

First, the distribution network management apparatus 610 may recognize one or more sections in which the variability occurs among a plurality of sections included in a distribution network, and may identify a plurality of energy routers 620 related to the one or more sections, among all of the energy routers arranged in the distribution network, that is, may determine targets to be controlled (S1010).

In addition, the distribution network management apparatus 610 produces initial command values for respective energy routers 620 through initial execution of the processing optimization operation and transmits the initial command values to the plurality of energy routers 620 (S1020).

Thereafter, the distribution network management apparatus 610 may receive monitoring data from a plurality of sensors arranged in the distribution network, and may identify the current magnitude of variability or predicted magnitude of variability in the area adjacent to the plurality of energy routers 620, that is, in the line section adjacent to the plurality of energy routers 620 (S1030).

The distribution network management apparatus 610 adjusts the communication cycle of the command value of each of the plurality of energy routers 620 according to the current magnitude of variability or the predicted magnitude of variability in the line section adjacent to the plurality of energy routers 620 (S1040).

The distribution network management apparatus 610, having adjusted the communication cycle of the command value for each of the plurality of energy routers 620 depending on the magnitude of variability in the energy router-neighboring area as described above may produce command values through the processing optimization operation, and may transmit the command values to corresponding energy routers according to the communication cycles of the respective energy routers 620 (S1050).

The above-described process may be implemented as a computer program, and the distribution network management apparatus 610 may be combined with the computer program, thereby performing the process. In other words, the computer program may be stored and installed in the distribution network management apparatus 610, and then the process may be performed by the distribution network management apparatus 610.

As described above, since the distribution network management apparatus 610 is able to reduce the amount of computation of the distribution network management apparatus 610 by adjusting the communication cycle of a command value for each energy router depending on the states of the energy routers 620 when transmitting the command value for bidirectional power conversion of a plurality of energy routers 620, the distribution network management apparatus 610 is able to properly manage the amount of computation even if the variability occurs frequently or simultaneously in the distribution network, thereby efficiently managing the distribution network.

The terms "include", "comprised of", "have", or the like as described above mean that a corresponding element may be encompassed therein unless otherwise stated, and thus the terms should be construed as further including other elements, instead of excluding the same. All terms, including technical or scientific terms, unless otherwise defined, have the same meaning as commonly understood by those skilled in the art to which the present disclosure pertains. Terms generally used, such as the terms defined in dictionaries, should be interpreted as being consistent with the meaning of the context of the related art, and are not to be interpreted as ideal or excessively formal meanings unless explicitly defined in the present disclosure.

The above description is merely illustrative of the technical idea of the present disclosure, and those skilled in the art to which the present disclosure pertains may make various modifications and changes without departing from the essential characteristics of the present disclosure. Therefore, the embodiments disclosed in the present disclosure are intended to explain the technical spirit of the present disclosure, instead of limiting the same, and the scope of the technical spirit of the present disclosure is not limited to the embodiments. The scope of protection of the present disclosure should be interpreted by the claims below, and all technical spirits equivalent thereto should be interpreted as being included in the scope of the present disclosure.

What is claimed is:

1. A system for managing a distribution network, the system comprising:
    a plurality of energy routers configured to control an amount of router power flowing between the distribution network and internal resources; and
    a distribution network management apparatus configured to transmit a command value for the amount of router power, which is produced according to a variability of the distribution network, to an energy router while adjusting a communication cycle of the command value depending on a state of the energy router regarding the command value,
    wherein the distribution network management apparatus is configured to produce a command value for each energy router through a processing optimization operation for the plurality of energy routers,
    wherein the state of the energy router comprises a control success rate of the energy router, and
    wherein the distribution network management apparatus performs the processing optimization operation prior to a subsequent communication time and, when the control success rate is less than a predetermined value, excludes the energy router from the processing optimization operation.

2. The system of claim 1,
    wherein the distribution network management apparatus is configured to control the communication cycle to be shortened as the control success rate increases.

3. The system of claim 2, wherein the distribution network management apparatus is configured to, when the control success rate is greater than or equal to a predetermined value, control the communication cycle to be prolonged as the control success rate increases.

4. The system of claim 2, wherein the distribution network management apparatus is configured to control the plurality of energy routers in different communication cycles depending on the control success rate.

5. A system for managing a distribution network, the system comprising:
    a plurality of energy routers configured to control an amount of router power flowing between the distribution network and internal resources; and
    a distribution network management apparatus configured to transmit a command value for the amount of router power, which is produced according to a variability of the distribution network, to an energy router while adjusting a communication cycle of the command value depending on a state of the energy router regarding the command value,
    wherein the distribution network management apparatus is configured to produce a command value for each energy router through a processing optimization operation for the plurality of energy routers,
    wherein the state of the energy router comprises a control success rate of the energy router, and
    wherein the distribution network management apparatus is configured to perform the processing optimization operation prior to a subsequent communication time and, when the control success rate is greater than or equal to a predetermined value, process the energy router using a fixed command value in the processing optimization operation.

6. The system of claim 5,
    wherein the energy router is configured to compare the command value with the amount of router power, thereby producing the control success rate, and transmit the control success rate to the distribution network management apparatus.

7. The system of claim 5,
    wherein when the control success rate is less than a predetermined value for a predetermined period of time, the energy router enters a maintenance mode.

8. The system of claim 5,
wherein when control success rates for a predetermined number of command values are or less than a predetermined value, the energy router enters a maintenance mode.

9. The system of claim 5, wherein the state of the energy router comprises further a magnitude of the variability that is caused by the amount of router power in a line section adjacent to the energy router, and
wherein the distribution network management apparatus is configured to adjust the communication cycle of the command value to be long when the magnitude of the variability is equal to or less than a predetermined value or when a predicted magnitude of the variability is equal to or less than a predetermined value.

10. The system of claim 5, wherein the state of the energy router further comprises an amount of available resources, which can be controlled by the energy router, and
wherein the energy router is configured to monitor the internal resources, thereby producing the amount of available resources, and transmit the amount of available resources to the distribution network management apparatus.

11. The system of claim 10, wherein the amount of available resources is determined according to a state of charge (SOC) of an energy storage system among the internal resources.

12. The system of claim 10, wherein the distribution network management apparatus is configured to adjust the communication cycle of the command value to be shortened when the amount of available resources is reduced and to be prolonged when the amount of available resources increases.

* * * * *